Figure 1:
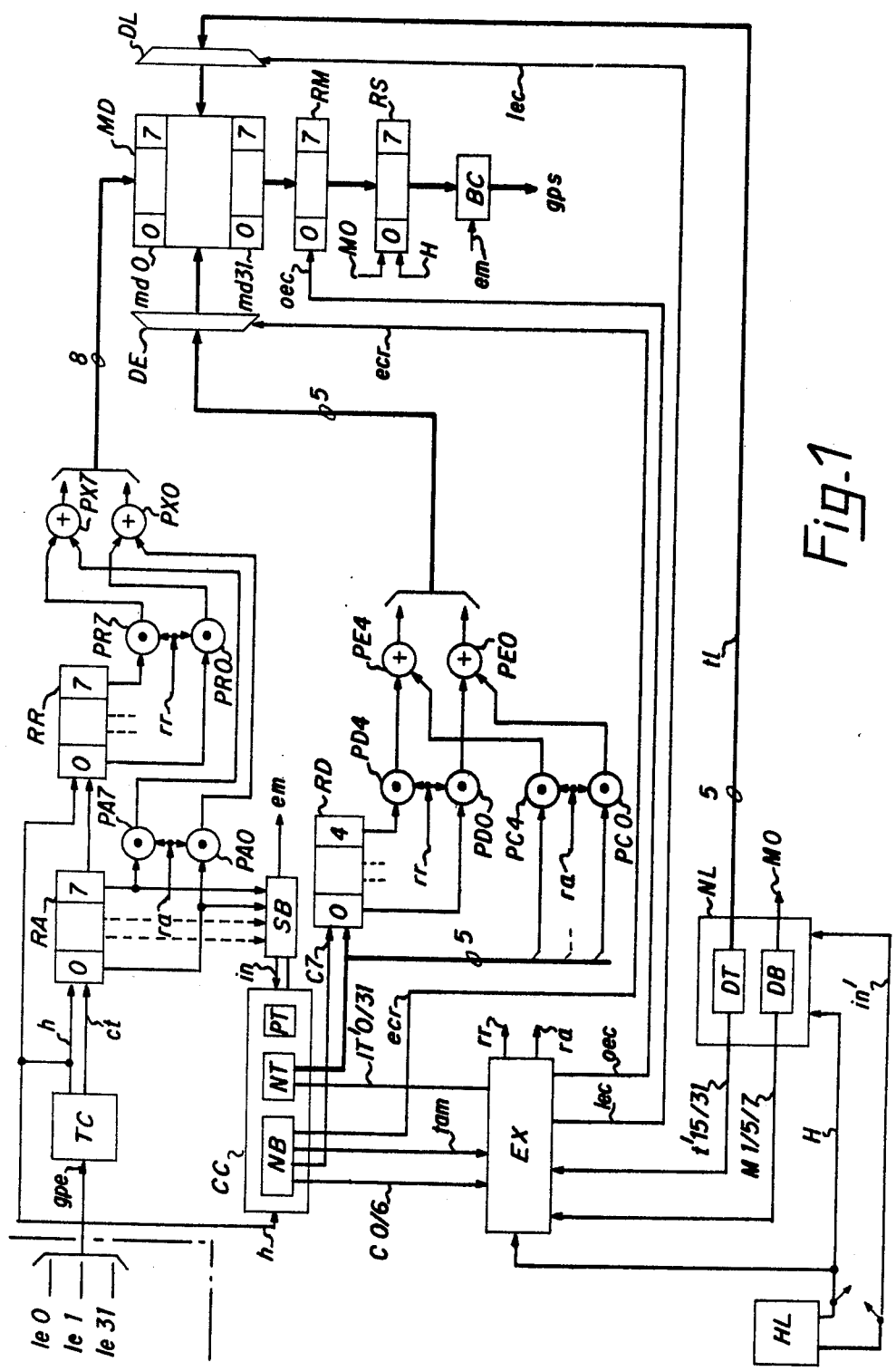

United States Patent [19]

Henrion et al.

[11] 4,086,437
[45] Apr. 25, 1978

[54] RESYNCHRONIZING CIRCUIT FOR TDM SYSTEM

[75] Inventors: Michel André Robert Henrion, Boulogne; André Lucien Coudray, Rueil-Malmaison, both of France

[73] Assignee: International Standard Electric Corporation, New York, N.Y.

[21] Appl. No.: 726,719

[22] Filed: Sep. 27, 1976

[30] Foreign Application Priority Data

Sep. 29, 1975 France .................... 75 29725

[51] Int. Cl.² .............................................. H04J 3/06
[52] U.S. Cl. ............................ 179/15 AF; 179/15 BS
[58] Field of Search ......... 179/15 AF, 15 BS, 15 AT; 358/149

[56] References Cited
U.S. PATENT DOCUMENTS

| | | | |
|---|---|---|---|
| 3,829,843 | 8/1974 | Cichetti | 179/15 AF |
| 3,928,727 | 12/1975 | Roche | 179/15 AF |
| 3,970,796 | 7/1976 | Gyurki | 179/15 AF |

*Primary Examiner*—Kathleen H. Claffy
*Assistant Examiner*—Joseph A. Popek
*Attorney, Agent, or Firm*—James B. Raden; Marvin M. Chaban

[57] ABSTRACT

A synchronization circuit for a system in which digital coded data is received by an exchange from a transmitting station in time division multiplex form and is transmitted in time division multiplex form. In such a system, the incoming data is received at a clock rate dependent on the clock of the transmitting station and is stored in a memory at that rate. Read out from the memory is at the exchange rate. Since only one operation in the memory, either read or write, can occur at a time, control must be imposed to separate in time the reading and writing operations. To provide this separation, a time shift equal in duration to one time slot is introduced to delay the later-started of two operations.

5 Claims, 9 Drawing Figures

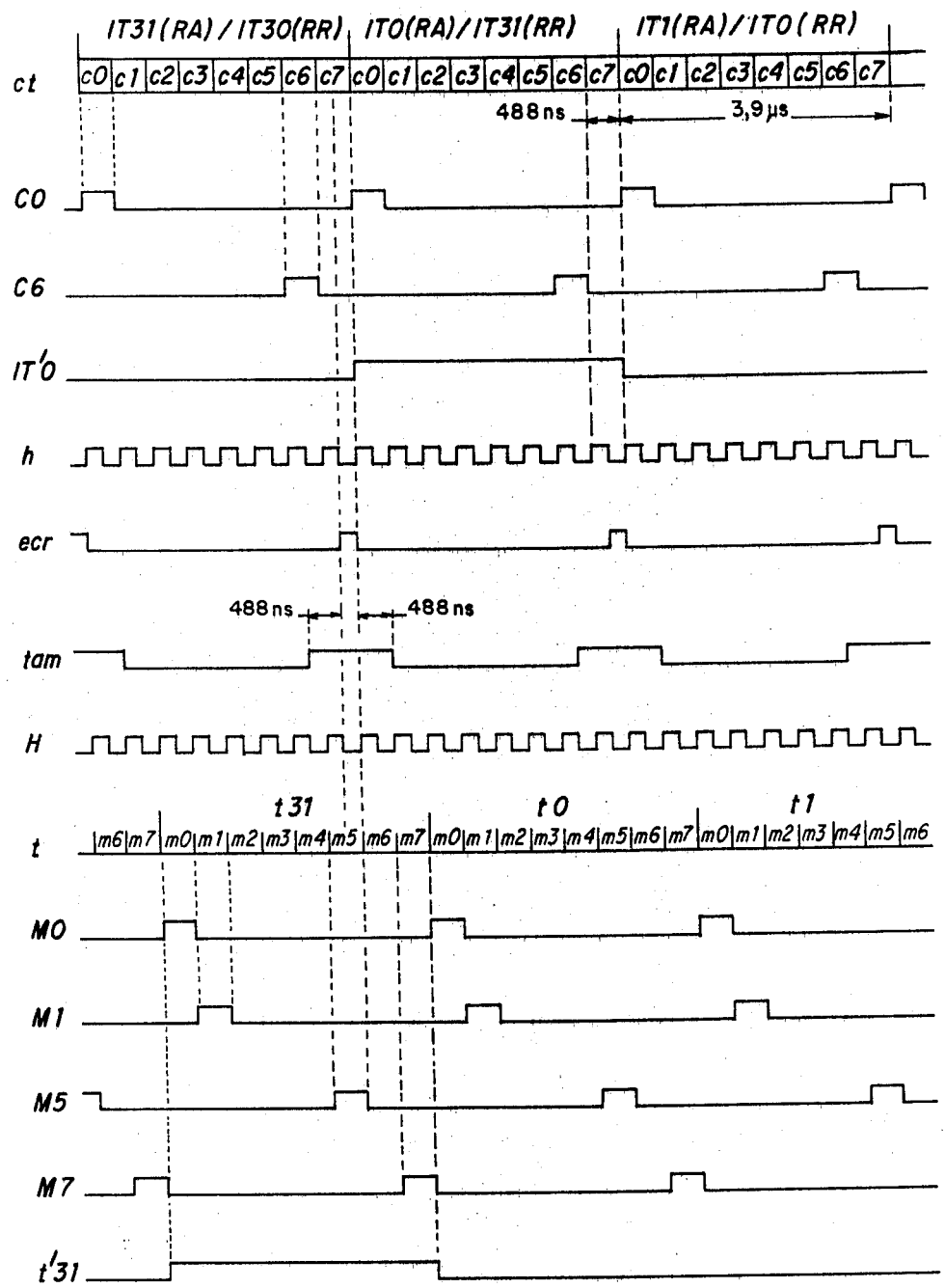

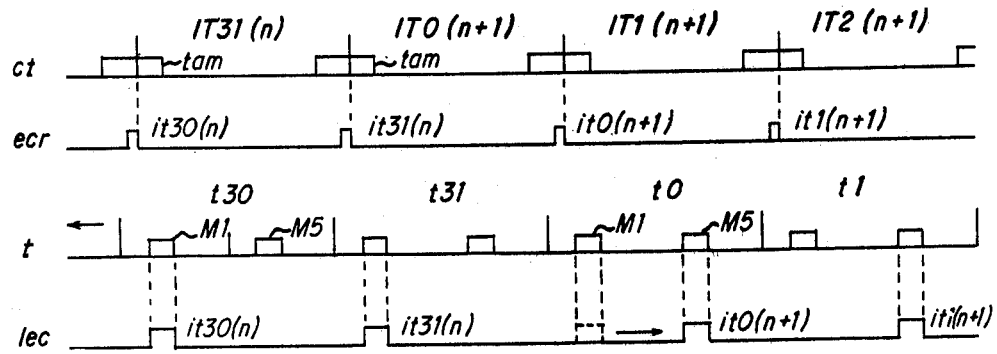
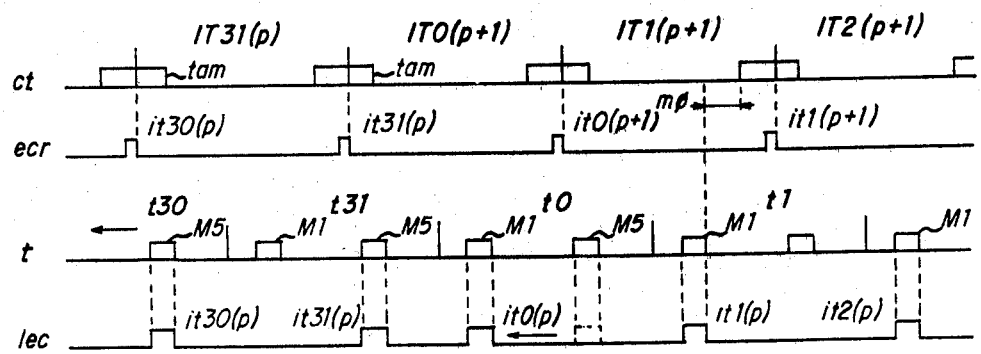
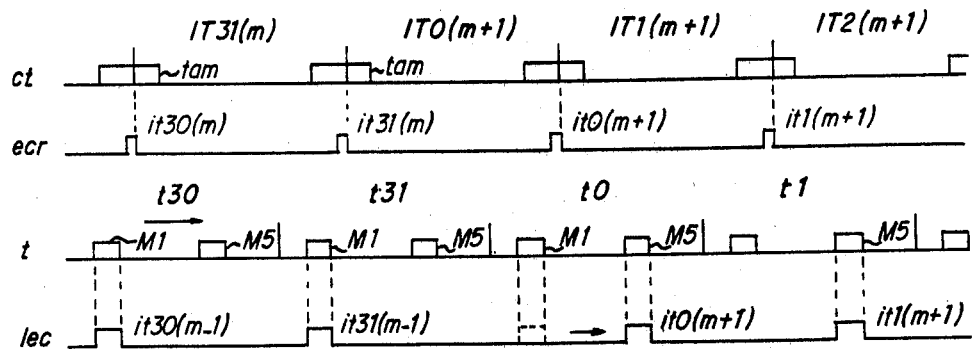

RESYNCHRONIZING CIRCUIT FOR TDM SYSTEM

The present invention relates to improvements in our copending application, Ser. No. 708,816 filed July 26, 1976 as its object a resynchronizing process and device for repetitive frame structured incoming information. It is applied in the time-division switching systems of coded signals and, namely, in telephone exchanges that apply the time-division switching of pulse code modulation signals.

At the inputs of such an exchange, the signals originating from the lines in operation are sampled at 8kHz and each sample is translated by a coder into an 8 bit binary signal combination. Each combination is transmitted in series along a conductor within a very short time interval making up a time channel. Thus it is possible to time-multiplex 32 channels for instance. The repetition period of the successive combinations of a channel is of 125 μs; consequently, the time slot allotted to each channel has a duration of about 3.9 μs. In the general case, an input primary multiplex group routes the signals originating from 30 lines occupying 30 time channels, two time channels being used for the signalling and the synchronization. A similar output primary multiplex group routes the signals intended for these same 30 lines.

Inside the exchange there will generally be numerous input and output multiplex groups. It is necessary that a coded combination originating along a time channel of a multiplex group should be retransmitted along a time channel of a selected multiplex group. This implies space switching operations, for the group-to-group connections, and time switching operations for the channel-to-channel connections. They will be performed with the help of a network which will include switching units and memories; this network can be of a well-known type so-called time-space-time.

In a multiple-exchange network, each exchange will be connected to a neighbouring exchange by multiplex groups of the type described above. At the output of an exchange, the output multiplex group is accomplished by a local clock which delimits the frames, the channels time slots, as well as the eight bit intervals, or moments, of each time slot.

At the input, in the exchange considered here, the local clock cannot be used for operating the signals from the input multiplex group since it is not necessarily in frequency synchronism, nor —and above all — in phase synchronism with the clock of the distant exchange such as it would appear through the middle of transmission. It is therefore necessary to reconstitute the distant clock for detecting and identifying the received signals.

Due to frequency differences between the distant clock and the local clock, and/or due to propagation time variations along the transmission channel, the position of the regenerated binary signals is a random position with respect to the local clock. Moreover, when the digital flow from the input multiplex is faster than the local digital flow determined by the local clock, there is received more bits than the exchange is able to process. In the other case where the digital flow from the input multiplex is smaller than the local digital flow, there is received a smaller number of bits than the amount of bits the exchange requires.

The switching operations already mentioned above should, preferably, bear upon synchronous multiplex groups for obvious simplification purposes. From the foregoing it can be seen the input groups originating from distant exchanges are associated with a reconstituted clock whose frequency and phase are different from those of the local clock and different from one another. It is therefore advisable to proceed with a resynchronization which will result in a time shift of the signals and, according to the direction of the frequency shift, into periodic doubling or suppression of incoming signals.

This problem is well known. The solution consists in storing the input combinations in a memory at the distant clock's rate; a memory location being assigned to each channel; then, to read therein the combinations at the local clock's rate. Yet, that sets a problem in case a memory is required to be used having but simple storing and reading control circuits, since it will happen periodically that a storing operation is required at the same time as a reading operation whereas the memory can accomplish only one of these two operations at a time.

Moreover, in assuming this problem as solved, it must be considered that the reconstituted distant clock may show alternative phase shifts or jitter with respect to the local clock, the clocks furthermore being in quasi-synchronism. The combinations of input channel are subject to an information being stored in the memory at moments placed alternately before and after the corresponding reading operation. When this storing operation passes from "before" on to "after" the reading operation, the memory will provide — for the channel considered — twice consecutively the previously stored combination. Whereas, when the storing operation passes from "after" on to "before" the previously stored combination is replaced by a new combination before being read, and may be lost. The jitter thus produced by seriously perturb the communications. This condition must be remedied, or at least the effects attenuated.

These problems have led to many prior solutions implying most often the use of two memories and necessitating costly and complex control logic circuits.

Our previously cited patent application provides both a simple and sure solution enabling the full resynchronization by means of only one memory. It has as its object a process of resynchronization of incoming frame-structured information repetitive of time intervals constituting time channels and conveying each as a coded combination, so as to provide outgoing information having the same structure with the help of a distant clock reconstituted from the incoming information structure, and with the help of a local clock determining the structure of the outgoing information. According to that process, the incoming information is stored into a junction memory, at the distant clock's rate, one storing operation per each input combination; then the outgoing information is read in the junction memory, at the local clock's rate, one reading operation per each output combination; and, in order that the storing and reading operations should never be simultaneous, one of these operations is time shifted for a predetermined duration in case there is a chance of collision, that is to say when the interval separating them has become shorter than a predetermined value. To that end, one of the said operations — storing or reading — can be performed at the one of two predetermined moments inside each time interval. Thus, the shifting of the operation is obtained by changing moments. Moreover, the said shifting is performed from that beginning of a frame and for the duration of a whole number of frames. When putting this process into operation, an exclusion circuit is provided, namely, to detect the approaching of a simultaneity between storing and reading; it includes means for generating a pre-collision damping signal delimiting a time space framing one of the operation — storing or reading — and means for detecting the coincidence of this pre-collision damping signal and a signal which controls the performing of the other of the said operations — reading or storing — and thus to originate a signal announcing a collision.

This time shifting of the reading operation, for instance, does not create any perturbation as long as the two clocks are sufficiently out of phase. The absence of perturbation does not occur when these two clocks are in quasi-synchronism since the reconstituted distant clock shows a jitter with respect to the local clock. Indeed, there may then be performed relatively often a shifting of the reading operation alternately in one direction and then in the other. Now then, this shifting in some cases, so-called critical cases, causes either a doubling or a skipping of a frame. Each of these perturbations is in itself acceptable, but it is not acceptable, in case of important jitter, to permit repeated shiftings causing alternately a doubling and then a skipping of a frame.

The present invention has therefore for its object a resynchronizing process and device for avoiding these disadvantages by increasing the phase gap between the reading and storing operations of one same time slot in the most unfavourable time configuration, that is to say during the carrying out of a critical shifting having caused a perturbation.

The resynchronizing process for repetitive frame structured incoming information of present invention is characterized in that into the reading and storing of combinations in the memory there is inserted a time slot added algebraically to the above mentioned shifting so as to increase the phase margin and protection against jitter.

Thus, in the case where the time shifting relates to the reading operations, the local clock being faster than the distant clock, the shifting of the reading from a time position, located at the end of a channel time slot to a time position located at the beginning of this channel time slot, makes this reading occur, before the storing operation. When both operations take place at the same memory address, the result is the double reading of one same frame. It then suffices that a reverse jitter, equal at most to the interval separating the two time positions of the reading, should cumulatively add to the continuous drift of one clock with respect to the other, that it be necessary to start the reverse shifting thus causing the skipping of a frame. The present invention provides in that case the step of introducing in the storing operations, for instance, an additional shifting of a time slot in the direction that suits. Thus, in order that it be necessary to start the said reverse shifting it is required that a reverse jitter, equal to the interval separating the two time positions of the reading operation increased by a channel time slot, should be added to the drift.

The present invention has also as its object a resynchronizing device for repetitive frame structured incoming information conformable to the device described in the previously cited patent application characterized in that it also comprises, on the path of the storing or of the reading out of the memory, an additional buffer register making it possible to introduce a delay exactly equal to a channel time slot into the storing or reading out of the memory; and not to perturb the input or output multiplex in the transmission circuit of storing or reading addresses, a buffer register making it possible to introduce a delay indentical to the foregoing one in the transmission of the said addresses is provided, as well as control circuits associated with these two additional registers to include or exclude these additional registers in the said circuits.

Figure 6:
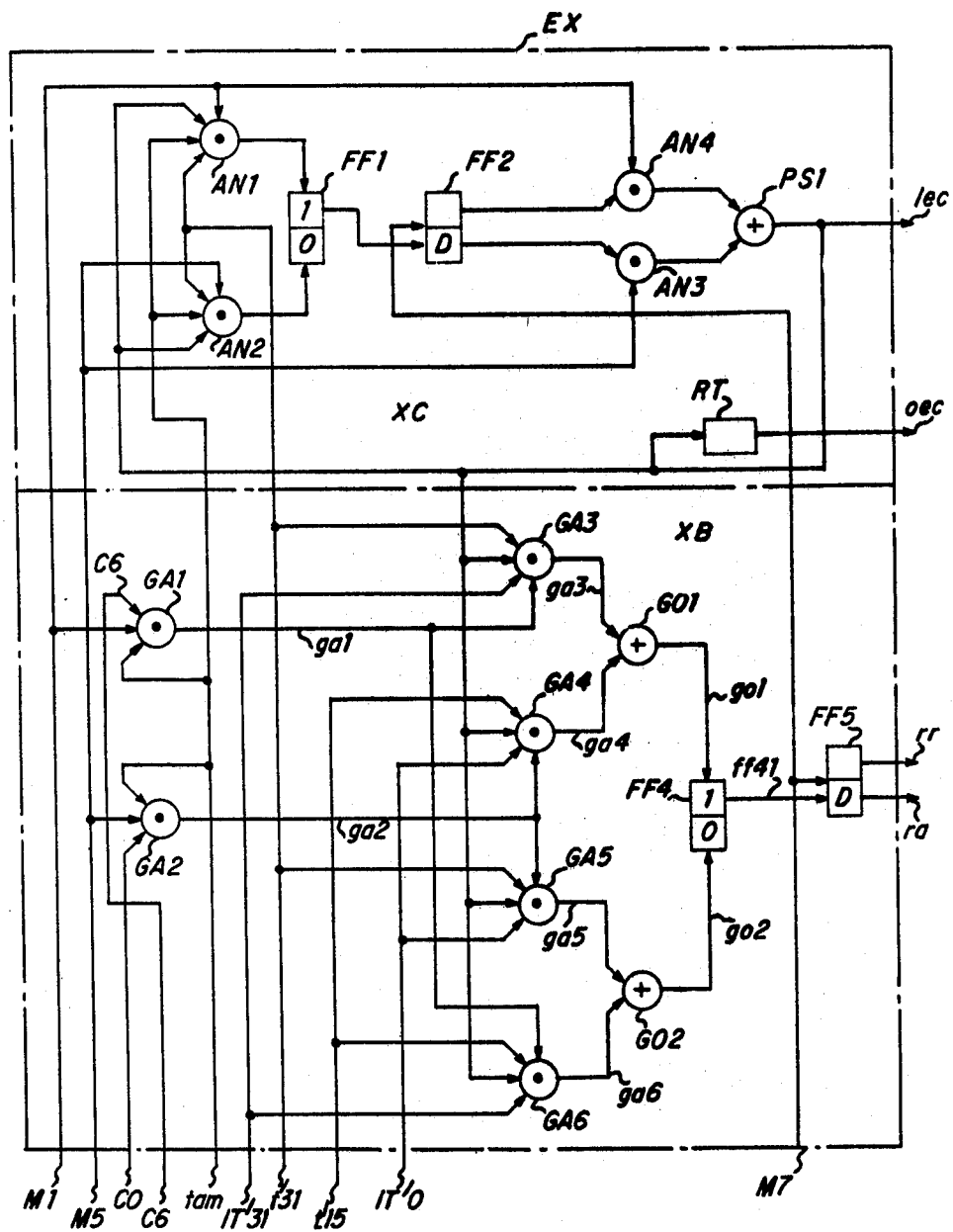
Figure 7:
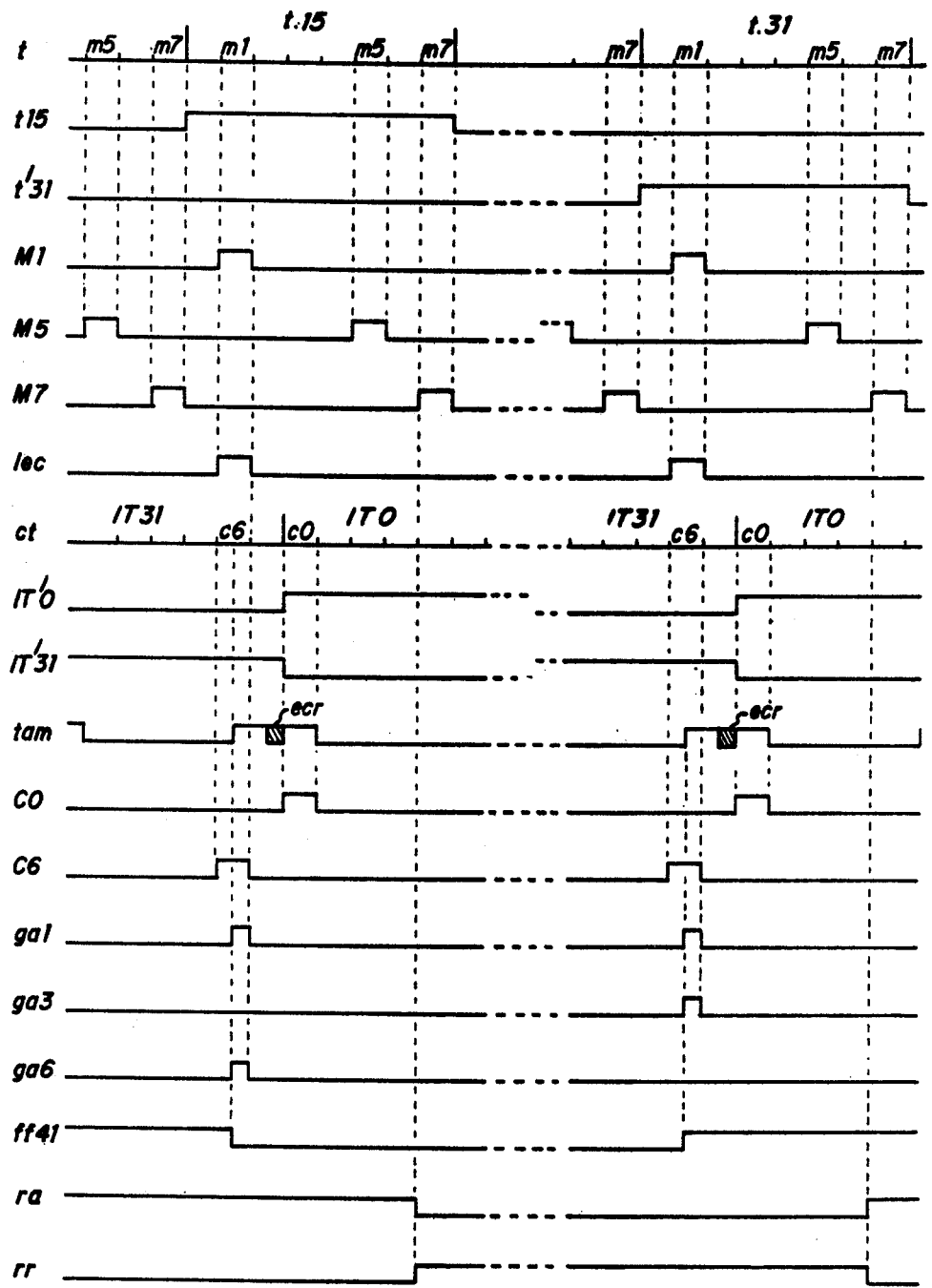
Figure 8:
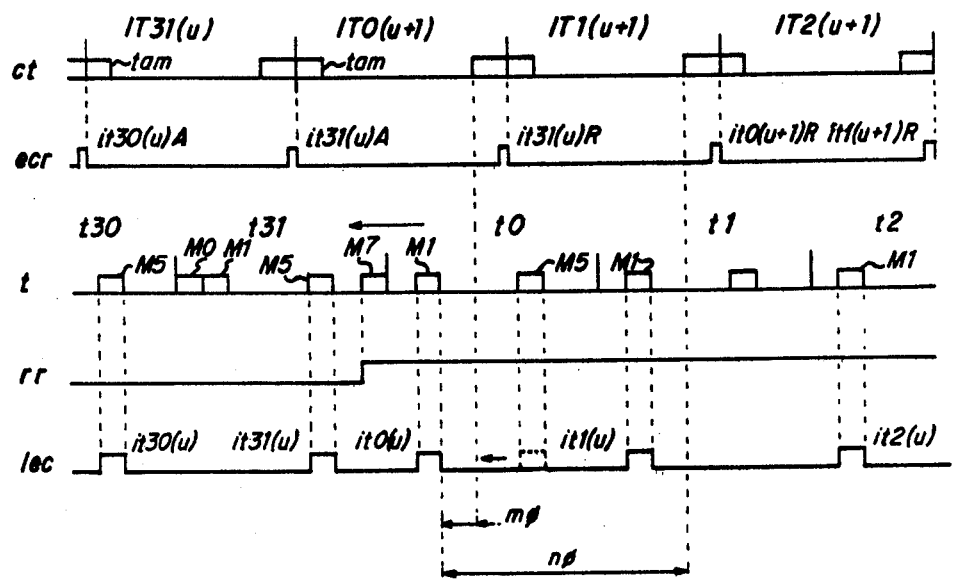
Figure 9:
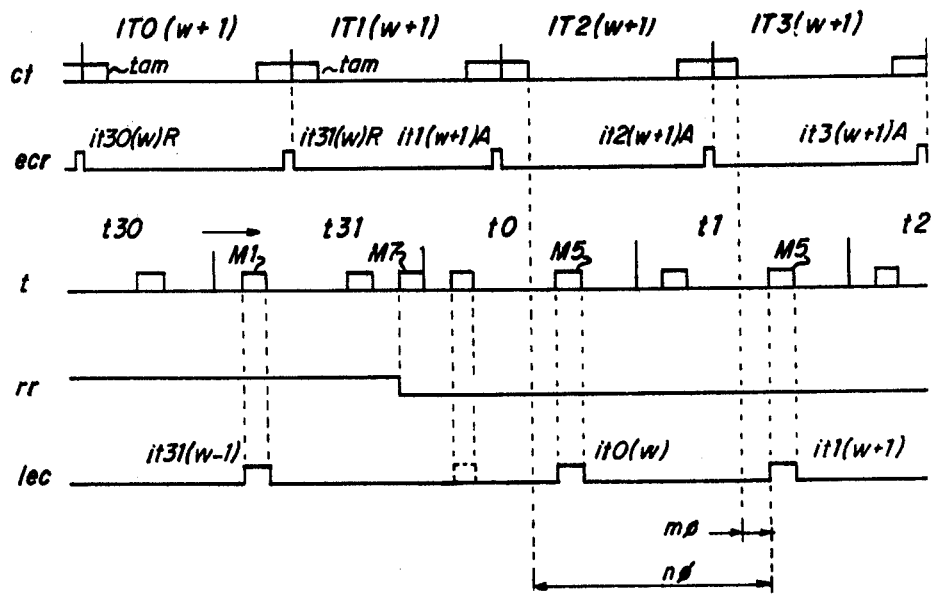

Various further features and objects of present invention will now be apparent from the following description which is given by way of non-limited example and with reference to the accompanying drawings which represent:

FIG. 1, the block diagram of a resynchronizing circuit designed according to present invention;

FIG. 2, chronograms defining the various signals utilized in the circuit of FIG. 1;

FIGS. 3 to 5, chronograms illustrating the time shifting operations of the reading out of the memory, conformable to the previously cited application, when the storing and reading operations or the reading and storing operations are performed in succession on the same address in memory;

FIG. 6, an embodiment of the control circuit EX in FIG. 1;

FIG. 7, chronograms illustrating the operating process of the routing circuit XB in FIG. 6;

FIGS. 8 and 9, chronograms illustrating the operations of storing into memory and critical time shifting of the reading out of the memory, conformable to present invention.

First will be described, in referring to FIG. 1, the block diagram of a resynchronizing circuit for incoming information in a digital switching exchange designed in conformity with present invention.

Thirty-two input channels $1e0, 1e1, \ldots, 1e31$ belonging to a distant exchange are multiplexed on an incoming group $gpe$ by means not shown. In the circuit of FIG. 1, a transcoder TC receives the signals of group $gpe$ and provides, in $ct$, the corresponding binary signals and, in $h$, a distant clock signal, which comprises one inpulse per bit received with the adequate phase with respect to the signals provided in $ct$.

A first input shifting register RA, having eight stages 0 to 7, controlled by the reconstituted clock impulses $h$, receives in series the eight bits $ct$ of each input coded combination. The output of each stage of this register is connected to an input of an AND gate. In order not to unnecessarily complicate the figure, only two of these gates are being shown; a gate PA0, one input of which is connected to the output of stage 0 of register RA and a gate PA7, and one input of which is connected to the output of stage 7 of register RA. Each of these gates is controlled by a signal $ra$ applied to its other input. The output of each of these gates is connected to the first input of an OR gate. Thus, the output of gate PA0 is connected to the first input of a gate PX0 and the output of gate PA7 is connected to the first input of a gate PX7.

The output of the last stage of input register RA is also connected to the input of a second input shifting register RR, having eight stages 0 to 7, controlled by the clock impulses $h$. The output of each stage of register RR is connected to an input of an AND gate. Only gate PR0, one input of which is connected to the output of stage 0 of register RR, and gate PR7, one input of which is connected to the output of stage 7 of this register have been shown. Each of these gates is controlled by a signal rr applied to its other input. The output of each of these gates is connected to the second input of the corresponding gate PX0/7. Thus, the output of gate PR0 is connected to the second input of gate PX0, the output of gate PR7 being connected to the second input of gate PX7.

In the presence of signal ra, signal rr being absent, the eight bits ct stored in the first input register RA are retransmitted, via gates PA0 to PA7, to the outputs of gates PX0 to PX7.

In presence of a signal rr, signal ra being absent, the eight bits ct stored in the second input register RR are retransmitted via gates PA0 to PA7, to the outputs of gates PX0 to PX7.

These bits are then retransmitted, in parallel, to a random access and non-erase reading junction memory MD. The memory MD includes 32 cells $md0$ to $md31$ used each for storing the eight bits of a coded combination. Each of these cells is associated with a time channel. Thus, the coded combination originated from the input channel $le0$ is stored in the memory cell $md0$, the coded combination originated from the input channel $le31$ being stored into the memory cell $md31$.

When the time multiplexing principle is being applied, the time is divided into identical sampling periods comprising frames of 125 $\mu s$. Each frame is divided into 32 identical time intervals of about 3.9 $\mu s$. During each time interval an eight bit coded combination at the rate of one bit about every 488 ns is transmitted. To make possible the identification of the frames, a synchronizing code is transmitted during a determined time interval, at beginning of frame for instance. The supervision block SB has as its function the detection of this synchronizing code. It provides, namely, in the absence of this code, a blocking signal em. It also provides, at the starting into operation of the device and at the first reception of this code, a resetting signal in towards a counter device CC.

The counter device CC, controlled by the distant clock impulses h, includes counters NB, NT and PT. Counter NB is a 3 stage counter. It steps one step at each impulse h. It restores to 0 position at the beginning of each input combination and it constantly provides the number, 0 to 7, of the received bit. As will be seen later, for certain positions, this counter provides signals ecr, tam, C0, C6 and C7.

Counter NT is a 5 stage counter. It steps one step, under control of a clock h impulse, when counter NB restores to position 0. It is in position 0 at the beginning of each input frame and it provides the number, from 0 to 31, of the input time channel within a frame, therefore also, as was seen above, of the cell of junction memory MD in which should be stored the coded combination originated from this time channel.

This five bit number is transmitted to a storing-addresses decoder DE associated with a memory MD via five OR gates PE0 to PE4 which receive, respectively, the output signals of five AND gates PC0 to PC4 and the output signals of five AND gates PD0 to PD4.

The AND gates PC0 to PC4 are controlled by signal ra and their inputs are, respectively, connected to the outputs of counter NT.

The AND gates PD0 to PD4 are controlled by signal rr. Their inputs are respectively connected to the outputs of a five stage buffer register RD. This register receives the five bits originated from counter NT; it is controlled by signal C7 originated from counter NB.

As will be seen subsequently, for certain positions, the counter NT also provides signals IT'0 and IT'31.

Counter PT is a one bit counter which defines the parity of each frame.

The exchange considered here comprises a local clock HL common (multiplying arrows) to all the circuits such as the one in FIG. 1. This clock provides impulses H to a counter device NL and to a control circuit EX.

The counter device NL, controlled by impulses H and restored to zero by a signal in' originated from the local clock HL, comprises two counters DB and DT.

Counter DB includes 3 stages. It steps one step at each impulse H. It constantly defines the number, 0 to 7, of each characteristic moment $m0$ to $m7$ of the time intervals $t0$ to $t31$ alloted respectively to 32 time channels of an output multiplex group gps. It restores to zero at the beginning of each output frame. It provides impulses M0, M1, M5 and M7 when it occupies respectively positions, 0, 1, 5 and 7.

Counter DT includes 5 stages. It steps one step, under control of a clock H impulse, when the counter DB restores to position 0. It is in position 0 at the beginning of each output frame and it provides the number $tl$, from 0 to 31, of the output time channel within a frame, therefore also the number of the cell of junction memory MD to be read. This number is therefore sent to a reading addresses decoder DL associated with memory MD. Counter DT also provides impulses $t'15$ and $t'31$ when it occupies positions 15 and 31 respectively.

The control circuit EX, which receives signals C0, C6, tam, M0, M1, M5, M7, $t'15$ and $t'31$ as well as the clock impulses H, produces, in response, a reading signal lec to the reading-addresses decoder DL. In presence of this signal, the coded combination, stored in the memory cell defined by address $tl$, is read. This coded combination is stored into a first output register RM under the control of an impulse oec provided by control circuit EX. It is then transferred into a second output register RS under the control of impulse M0, and then to the outgoing line recipient of the output multiplex group gps via a blocking circuit BC controlled by the blocking signal em originated from the supervision block SB.

Now will be described, in also referring to the chronograms of FIG. 2, the general operating process of the circuit in FIG. 1.

On the first line of FIG. 2 are shown the coded combinations ct originating from the input channels $le31$, $le0$ and $le1$, and which occupy respectively the time slots IT31, IT0 and IT1. Each coded combination comprises eight bits $c0$ to $c7$ transmitted at the rate of one bit every 488 ns to the first input register RA. This same coded combination is then transmitted at the same rate to the second input register RR whereas the next coded combination is transmitted, same as the previous one, to the first input register RA, and so on. Therefore, when register RA contains the coded combination originating from the input channel $le(j)$ which occupies the time slot IT(j), the register RR contains the coded combination originating from channel $le(j-1)$ which occupies the time slot IT(j-1). Number j, from 0 to 31, of time slot IT(j) which is also the number of the memory cell $md(j)$ into which is stored the coded combination contained in the first input register RA, is provided by counter NT and gates PC0 to PC4 and PE0 to PE4 to the storing addresses decoder DE. Number (j-1) of the preceding time slot, IT(j-1), which is also the number of the memory cell md(j-1) into which is stored the coded combination contained in the second input register RR, is provided by register RD and gates PDO to PD4 and PE0 to PE4 to decoder DE.

Each combination is stored in the junction memory MD as soon as the eighth bit is stored in an input register. To that end, counter NB provides a storing impulse ecr. This impulse is illustrated by the chronogram ecr in FIG. 2. This counter provides also a damping impulse tam which, according to example chosen, begins 488 ns before the storing impulse ecr and which finishes 488 ns after the end of that impulse.

On the other hand, according to whether it is required to store the coded combination written in the first input register RA, or the one written in the second input register RR, the control circuit EX will provide either signal ra, or signal rr. As was already seen above, these two signals enable also the transmission of the writing address which suits to decoder DE.

This operating process is of a systematic nature. As long as transcoder TC provides the reconstituted impulses h of the distant clock, the counters of block CC keep operating. When counter NB provides signal ecr, the address provided at that very instant by counter NT, or the address written into register RD when the preceding impulse ecr originated, helps to store the contents of register RA, or of register RR, into a cell of memory MD. In normal operation, the supervision block SB has synchronized respective counters NB, NT and PT; and the combinations ct are stored one by one into the cells md0 to md31 for each frame of the input group.

There remains the step of determining the reading moment, at the rate of the local clock, of the stored coded combinations. According to the principle described in the cited application, in order to avoid any simultaneity between the reading operations and the storing operations, a reading impulse lec is provided in the absence of impulse tam and sufficiently distanced from this impulse so as to keep safe at the maximum from the successive storing-reading simultaneities due to a possible jitter of one clock with respect to the other.

The combinations stored into the memory MD are read out, at the rate of local clock HL, once every 3.9 μs. The stepping of the counters of counter device NL is controlled by the clock signal H at 2.048 MHz identical to signal h. A synchronizing signal in', originated from the local clock HL, initiates counters DT and DB when the equipment is set into operation. Counter DT defines, namely, the 3.9 μs time slots, t0 to t31, alloted respectively to the output channels of the multiplex group gps. When it is in position 15 and in position 31 it provides impulses '15 and t'31 respectively. Counter DB defines the eight 488 ns characteristic moments m0 to m7 of each of the time slots t0 to t31. When it is in position 0, 1, 5 and 7 it provides impulses M0, M1, M5 and M7 respectively. These various signals are illustrated by the corresponding lines in FIG. 2.

It is assumed that the reading impulse lec is provided during the characteristic moment m1, that is to say at the same time as impulse M1, and that — taking into account the relative shifting of the two clocks — the storing operation is performed at quite a distant moment, during the characteristic moment m5 according to the example illustrated by chronograms in FIG. 2, in order that impulse tam should not coincide with impulse M1.

If the distant clock deviates with respect to the local clock, the time interval separating the damping impulse tam — originated from impulses h — from impulse M1 — originated from impulses H — diminishes. As soon as there is a risk of collision, the control circuit EX, at end of local frame, that is to say in presence of impulse t'31 provided during each time slot t31, stops generating — the reading impulse during moment m1 but will henceforth generate it during moment m5. The time interval separating impulse M1 from impulse M5 being longer than the duration of damping impulse tam, it is assured that this latter and impulse lec do not coincide. At the end of a relatively long time, the deviation of the distant clock being continuous, but lagging with respect to the duration of a frame, the impulses lec and tam will again be in coincidence. In the same manner as is described above, impulse lec will no longer be provided during the characteristic moment m5 but during the characteristic moment m1. Thus are therefore avoided the risks of storing-reading simultaneity. These successive shiftings of the reading operations are performed at different memory addresses.

Now will be described, in referring to FIGS. 3 and 4, the perturbations that may occur due to a shift when reading and storing operations are performed consecutively at the same memory address.

It is assumed for this example that the local clock HL is faster than the distant clock and that the reading operations take place, as is shown by the chronograms in FIG. 3, during moment m1. Storing impulse ecr, provided at end of time slot IT31 of the frame of rank n, controls the storing of coded combination it31(n), transmitted during that time slot, into cell md31 of the junction memory MD. Cells md0 to md31 of that memory therefore contain the coded combinations it0(n) to it31(n) respectively.

Reading impulse lec provided then during the time slot t31 controls the reading of the contents of memory cell md31, therefore of combination it31(n). This combination is stored successively into output registers RM and RS.

Storing impulse ecr provided at end of time slot IT0(n+1) of the frame of rank (n+1) controls the storing of coded combination it0(n+1) into cell md0 of the memory MD.

A collision is indicated between impulse lec and the corresponding impulse tam (see FIG. 2). Consequently, the control circuit EX stops generating signal lec during moment m1 but will henceforth generate it at the appearance of impulse M5. The first signal lec in the time slot t0 controls the reading of contents of the memory cell md0, that is to say of the coded combination it0(n+1).

The operating process proceeds in the manner as described above. The time shifting of the reading operations from m1 onto m5 has not therefore brought about any perturbation.

The local clock being faster than the distant clock, the time interval separating impulse M5 from impulse tam, will then diminish so as to finally cancel itself, several frames later; as is shown by the chronograms in FIG. 4.

Storing impulse ecr, provided at end of time slot IT31(p), controls the storing of coded combination of it31(p) into cell md31 of the memory MD. The cells md0 to md31 of that memory therefore contain the coded combinations it0(p) to it31(p).

Reading impulse *lec*, provided during moment *m*5 of time slot *t*31, controls the reading of coded combination *it*31(*p*). Collision of impulses *lec* and *tam* will then trigger the control circuit EX. This latter will henceforth provide the reading impulses *lec* during moment *m*1. In the time slot *t*0, this impulse is therefore provided before the next storing impulse *ecr*. It controls the reading of contents of the memory cell *md*0, that is to say combination *it*0(*p*).

The next storing impulse *ecr* controls the storing of coded combination *it*0(*p*+1) into memory cell *md*0; and the next reading impulse *lec* controls the reading of coded combination *it*1(*p*) stored into memory cell *md*1, and so on.

The time shifting of the reading operations from *m*5 to *m*1 has therefore brought a perturbation this time; frame *p* is read twice. This perturbation is inevitable in asynchronous operation; it will occur periodically but it is advisable to limit its occurrence to a minimum. The occurrence of these shifts, so-called critical shifts, is very seldom in the case only of a continuous deviation of one clock with respect to the other. The same conclusion does not apply when they are added alternative phase variations or jitters. Indeed the phase jitter admissible by the system without bringing in any perturbations of the information — to be so-called phase margin $m\phi$ — is represented in FIG. 4 by the time separating the trailing edge of impulse M1 and the leading edge of the corresponding damping impulse *tam*. It therefore is, by neglecting the width of these impulses, at the most equal to a half time slot, that is 1.95 μs.

In referring to the chronograms of FIG. 5, the evidence will be shown of the perturbations brought about by a shift of the reading operations, conformable to the apparatus of the cited application caused by a reverse jitter; whereas, time shifting of the reading of *m*5 to *m*1 (FIG. 4) has just been made.

This reverse jitter, adding itself to the deviation, and being important enough to exceed the phase margin $m\phi$, can be represented by a sliding towards the right of lines *t* and *lec*, whereas the deviation in frequency of FIG. 4 resulted into a sliding of these same lines towards the left. The time interval separating the reading impulse *lec* from impulse *tam*, framing the storing signal *ecr* provided at the end of time slot IT30*m*), is successively reduced to zero.

Thus, the reading impulse, provided with impulse M1, controls the reading of contents of memory cell *md*30, that is to say of coded combination *it*30(*m*−1).

The storing impulse *ecr* provided immediately after that reading impulse, that is to say at end of time slot IT30(m), controls the storing of the combination *it*30(*m*) into memory cell *md*30.

Reading impulse *lec* provided at characteristic moment *m*1 of time slot *t*31 controls the reading of contents, *it*31(*m*−1), of cell *md*31, the next storing impulse *ecr* controlling the storing of combination *it*31(*m*) into that cell.

Then, the collision of impulses *lec* and *tam* triggers the control circuit EX. This occurrence does not provide any reading impulse at characteristic moment *m*1 of time slot *t*0. The storing impulse *ecr* which follows, controls the storing of combination *it*0(*m*+1) into memory cell *md*0.

Reading impulse *lec* provided at characteristic moment *m*5 of time slot *t*0 controls the reading of contents of memory cell *md*0, therefore of combination *it*0(*m*+1).

Thus, due to this time shifting of the reading operations, the frame *m* has not been read.

It is seen therefore that, due to a critical shifting of the reading imposed by the continuous derivation of one clock with respect to the other and causing the double reading of a frame (FIG. 4), a reverse jitter will cause — a shifting which leads to the skipping of one frame.

It is therefore important to avoid as much as possible this second shift due to the jitter, whereas the frequency sliding will subsequently produce an additional frame redoubling. The present invention produced that effect by a large measure in increasing by a time interval the phase margin $m\phi$, primarily due to the addition of the second input register RR, and, to the addition of a routing circuit in the control circuit EX in order to generate signals *ra* and *rr*.

Now will be described, in referring to FIG. 6, an embodiment of the control circuit EX in present invention.

The control circuit EX in FIG. 6 includes an exclusion circuit XC which provides, namely, the reading signal *lec* and a routing circuit XB which provides, namely, the control signals *ra* and *rr* of the gates associated with the outputs of the input registers RA and RR and of the register RD.

The exclusion circuit XC comprises, essentially, four AND gates AN1, AN2, AN3 and AN4, an RS flip-flop FF1, a D flip-flop FF2, a circuit RT engendering a delay $\theta$ and an OR gate PS1.

Gate AN1 receives impulses M1, *lec, tam* and *t*′31. It provides an output signal to the set input of flip-flop FF1.

Gate AN2 receives impulses M5, *lec, tam* and *t*′31. It provides an output signal to the reset input of flip-flop FF1.

Flip-flop FF1 provides a signal on its direct output connected to the input D of flip-flop FF2. This latter receives also impulses M7 on its clock input. Its direct and complimentary outputs are connected respectively to an input of gates AN3 and AN4. These latter are controlled respectively by impulses M5 and M1. The outputs of gates AN3 and AN4 are connected to the inputs of gate PS1.

Gate PS1 provides the reading signal *lec*, to the reading addresses decoding circuit DL, to an input of gates AN1 and AN2 and to the input of circuit RT. Signal *lec*, delayed by a period of time $\theta$ by circuit RT, becomes signal *oec* and enables the storing into register RM, in FIG. 1, of the word read out of memory MD.

Explanation will not be given in detail of the operating process of exclusion circuit XC as described in the cited copending application. Assuming reading signal *lec* is to be provided at moment *m*1 — that is to say at the same time as impulse M1 — the probability of a collision between impulse *tam* and impulse *lec* during the time slot *t*31 causes the passing of the gate AN1 output signal to logic level 1. Consequently, flip-flop D triggers into position 1 as soon as the next impulse M7 appears and thus unables gate AN4 and enables gate AN3. This latter therefore retransmits the next impulse M5, that is to say during moment *m*5 of time slot *t*0, to the gate PS1 which restransmits it in the shape of a reading impulse *lec*.

The exclusion circuit XC has therefore indeed detected the imminence of a simultaneity between the reading and storing functions of the memory operations; and, in order to avoid this simultaneity, has cancelled the reading operation which normally should have taken place during characteristic moment $m1$ of time slot $t0$. This reading operation is now controlled by signal *lec* provided during characteristic moment $m5$ of time slot $t0$. The operating process of the device in FIG. 1 will then proceed normally.

In case of continuous deviation, circuit XC will detect in the same manner a collision between impulse *tam* and impulse *lec* provided at the same time as impulse M5 and will proceed with the shifting of the reading operations by replacing, during a time slot $t0$, impulse *lec* — provided at characteristic moment $m5$ — by an impulse *lec* provided at characteristic moment $m1$.

Routing circuit XB comprises, essentially, six AND gates GA1 to GA6, two OR gates GO1 and GO2, an RS flip-flop FF4 and a D flip-flop FF5.

Gate GA1 receives impulses M1 and *tam* as well as impulse C6 provided by counter NB (FIG. 1) during moment $c6$ of each time slot IT0 to IT31. It provides a signal $ga1$ to an input of gate GA3 and of gate GA6.

Gate GA2 receives impulses M5 and *tam* as well as impulse C0 provided by counter NB during moment $c0$ of each time slot IT0 to IT31. It provides a signal $ga2$ to an input of gate GA4 and of gate GA5.

Gate GA3 receives also reading impulse *lec* originated from circuit XC, impulse $t'31$ and impulse IT'31 provided by counter NT (FIG. 1) during each time slot IT31.

Gate GA4 receives also impulse *lec*, impulse $t'15$ provided by counter DT during each time slot $t15$ and impulse IT'0 provided by counter NT during each time slot IT0.

Gate GA5 receives reading impulse *lec* and impulses $t'31$ and IT'0; and gate GA6 receives impulses *lec*, $t'15$ and IT'31.

Gates GA3 and GA4 provide respectively signals $ga3$ and $ga4$ to gate GO1 which provides in response a signal $go1$ to the set input of flip-flop FF4.

Gates GA5 and GA6 provide respectively signals $ga5$ and $ga6$ to gate GO2 which provides in response a signal $go2$ to the reset flip-flop FF4. This latter provides, on its direct output, a signal $ff41$ to input D of bistable FF5 whose clock input receives impulses M7. Bistable FF5 provides signal $ra$ on its direct output and signal $rr$ on its complementary output.

Now will be described, in also referring to FIG. 7, the operating process of routing circuit XB. It will first be assumed that the local clock is slower than the distant clock, there is a collision between reading signal *lec* — during moment $m1$ of time slot $t15$ of the outgoing frame — and damping signal *tam* enframing the storing signal *ecr* provided at end of time-slot IT31 of the incoming frame.

It is also assumed that flip-flops FF4 and FF5 are set, therefore that the routing circuit XB provides a signal $ra$ of logic level 1, and a signal $rr$ of logic level 0.

Gate GA1 which receives simultaneously signals *tam*, C6 and M1, provides a signal $ga1$ of logic level 1.

Gate GA6, whose inputs IT'31, *lec*, $t'15$ and $ga1$ are at logic level 1, provides a signal $ga6$ of logic level 1.

OR gate GO2, one input of which is at logic level 1, provides a signal $go2$ of logic level 1. The restoring to logic level 0 of signal C6 causes the passing of signal $go2$ to logic level 0. Flip-flop FF4 triggers to logic level 0 on the leading edge of that signal. This flip-flop therefore provides a signal $ff41$, of logic level 0, to the input D of bistable FF5.

The leading edge of next impulse M7, provided during characteristic moment $m7$ of the time slot $t15$, causes flip-flop FF5 to trigger into position 0.

Signal $ra$, provided by this flip-flop therefore passes to logic level 0, signal $rr$ passing to logic level 1.

As explained previously, during that operation, the exclusion circuit XC does not cause any shifting of the reading operation, such a shift occuring only at the end of output frame.

The operatiions described act, to detect the direction of the collision and to pre-select the input register in view of the next shift. In the present example a collision was met between damping impulse *tam* and the trailing edge of impulse *lec* (local clock slower than distant clock). This collision will be so-called "rear collision".

As will be explained subsequently, during a critical shifting of the reading operation which will take place several frames later, in order to increase the phase margin $m\phi$ (FIG. 4) the storing operation will also be shifted by a time interval forward in storing into memory no longer the coded combinations originated from register RR (FIG. 1) but the coded combinations originated from register RA. It is therefore the passing of register RR to register RA that will enable increasing the phase margin. It was therefore indeed necessary, beforehand, to arrange that the coded combinations, originated from register RR and not those originated from register RA, be stored.

Within the time configuration of a critical shifting illustrated by the right-side part of the chronograms in FIG. 7, that is to say at the moment of a rear collision between reading impulse *lec* provided during moment $m1$ of time slot $t31$ of the output frame and damping signal *tam* enframing the storing signal *ecr* provided at end of time slot IT31 of the input frame, flip-flops FF4 and FF5 are in position 0.

Gate GA1 provides a signal $ga1$ of logic level 1, during the simultaneity of impulses M1, *tam* and C6.

Gate GA3, whose inputs *lec*, $t'31$, IT'31 and $ga$ are at logic level 1, provides a signal $ga3$ of logic level 1. This signal is retransmitted, in the form of a signal $go1$ of logic level 1, by the OR gate GO1 to set the input of flip-flop FF4. This latter triggers to position 1 on the leading edge of signal $go1$ and provides a signal $ff41$ of logic level 1, to the input of flip-flop FF5.

As soon as the leading edge of the next impulse M7, occurs during moment $m7$ of time slot $t31$ of the output frame, the flip-flop FF5 triggersto position 1. It therefore provides a signal $ra$ of logic level 1 and a signal $rr$ of logic level 0.

Thus, in the case of a critical shift required by a rear collision, the routing circuit XB routes, in view of storage in junction memory MD, the coded combinations originated from the first input register RA (FIG. 1) towards that memory, instead of the coded combinations originated from the second input register RR.

In the same way it can be shown that in the case of a critical shift required by a front collision, that is to say a collision between damping impulse *tam* and leading edge of the reading impulse *lec*, the routing circuit XB routes, in view of their storage in junction memory MD, the coded combinations originated from the second input register RR towards that memory, instead of the coded combinations originated from the first input-register RA, this operation being preceded, if necessary, by a pre-selection of the input register RA.

Further referring to FIG. 8 we will describe the steps in routing of the bits of the coded combinations to the various elements in FIG. 1 during a critical time shifting of the out-of-memory reading operations such as when the local clock is faster than the distant clock and the storing and reading operations are performed successively on the same memory address.

It will first be assumed, as is shown by the chronograms in FIG. 8, that the reading operations take place during moment $m5$, and that the control circuit EX provides a signal $ra$ of logic level 1 and a signal $rr$ of logic level 0. Logic gates PA0 to PA7 and PC0 to PC4 are therefore enabled whereas gates PR0 to PR7 and PD0 to PD4 are disabled.

At the end of time slot IT30 of the rank $u$ input frame, the first input register RA contains the coded combination $it30(u)$ and the second input register RR conains the coded combination $it29(u)$. At the same instant, counter NT of device CC provides the address of memory cell $md30$ to the storing addresses decoder DE via gates PC0 to PC4 and PE0 to PE4; register RD is containing the address of memory cell $md29$.

The storing impulse $ecr$ provided at end of the time slot IT30($u$) controls the storing of coded combination $it30(u)$, provided to memory MD by the register RA via gates PA0 to PA7, into memory cell $md30$ and noted $it30(u)$A on the chronogram $ecr$ in FIG. 8.

Reading impulse $lec$, provided during characteristic moment $m5$ of local time slot $t30$, controls the reading of the coded combination $it30(u)$ stored into memory cell $md30$ whose address $t1$ is provided by counter DT.

As was already described, a storing control impulse $oec$ is provided after the $\theta$ delay. This impulse controls the storing of coded combination $it30(u)$ into output register RM which contained previously the coded combination $it29(u)$.

An impulse MO is provided during the first characteristic moment $m0$ of time slot $t31$. This impulse causes the storing of the contents of register RM, that is to say the coded combination $it30(u)$, into the second output register RS. This latter enables either the availability of the eight bits of this combinatiion during the 3.9 $\mu$s of time slot $t31$, or the retransmission in series form of these eight bits at the rate of 2.048,10$^6$ bits per second.

Impulse M1 provided subsequently is without any effect.

Storing impulse $ecr$ provided at end of time slot IT31-($u$) controls the storing of the coded combination $it31$-($u$), originated from register RA, into cell $md31$ of memory MD.

The local clock being faster than the distant clock, the time separating impulse $lec$ from impulse $tam$ cancels, as is shown by the chronograms in FIG. 8, line $ct$.

The shifting operations are then started and progress during that time slot $t31$ in the manner already described above.

A reading impulse $lec$ is provided during moment $m5$ of the time slot $t31$. It controls the reading of the coded combination $it31(u)$ stored in the memory cell $md31$. In the way already described above, this combination is retransmitted to the output $gps$ via output registers RM and RS.

The control circuit EX which has detected the collision of the reading impulse and of the damping impulse (front collision) controls, on the one hand, the passage of signal $rr$ to logic level 1 — signal $ra$ passing to logic level 0 as soon as appears the leading edge of impulse M7 provided during the time slot IT31 — and, on the other hand, the time shifting of the reading operations of $m5$ to $m1$, in the manner already described above.

The result is that gates PA0 to PA7 and PC0 to PC4 are disabled, and gates PR0 to PR7 and PD0 to PD4 are enabled. Thus, only the coded combinations stored in the second input register RR can be provided to memory MD to be stored into the cells defined by the five address bits provided by register RD.

Reading impulse $lec$ provided therefore during characteristic moment $m1$ of time slot $t0$ controls the reading of the coded combination stored into memory cell $md0$, that is to say of combination $it0(u)$.

Storing impulse $ecr$ provided at end of time slot ITO(-$u$+1) controls the storing, into memory cell $md31$, of the coded combination $it31(u)$ provided by the second input register RR (impulse $ecr$ referenced $it31(u)$R on the chronogram $ecr$ in FIG. 8).

Impulse M5 provided during the characteristic moment $m5$ of time slot $t0$ is without any effect on the operation of the device.

Reading impulse $lec$, provided during moment $m1$ of time slot $t1$, controls the reading of coded combination $it1(u)$ stored in memory cell $md1$; and the operation of the device of present invention proceeds in the manner already described above.

Thus, collision of the reading signal and of the damping signal has been detected and has brought a shifting of the reading operations of $m5$ to $m1$. As the case described covers a critical shifting intended to bring about a double reading of the rank ($u$) frame, the routing circuit XB (FIG. 6) has controlled the retransmission to memory MD of the coded combinations originated from the second input register RR instead of the combinations originated from the first input register RA.

In this way, in case of reverse jitter of one clock with respect to the other — that is to say a phase derivation which can be represented by a shifting to the right of chronograms $t$ and $lec$ in FIG. 8 — the new phase margin $n\phi$ is equal to the preceding phase margin $m\phi$ increased by a time slot (3.9 $\mu$s).

Therefore, when the local clock is faster than the distant clock, and in the case of a critical shift — that is to say a time shift bringing about the double reading of one same frame — the process and the resynchronizing circuit of present invention enable increasing the phase margin of reverse jitter, by a time slot at the price only of a double storing into memory of a coded combination ($it31(u)$ in the example chosen here).

Now will be described, in short, the operating process of the circuit of present invention during a critical shift, the local clock being slower than the distant clock (rear collision), by also referring to the chronograms in FIG. 9.

It was seen above (chronograms in FIG. 7) that such a collision would cause the preselection of input register RR during time slot $t15$. It is assumed therefore that this preselection has been performed and that the signal $rr$ is at logic level 1.

The coded combinations which are stored into memory MD are therefore the coded combinations originated from input register RR.

Thus, storing impulse $ecr$, provided at end of time slot IT31 of the rank $w$ input frame, controls the storing of coded combination $it30(w)$, originated from register RR (impulse $ecr$ referenced $it30(w)$R on the chronogram $ecr$ in FIG. 9) into memory cell $md30$ identified by the 5 bits originated from register RD.

Reading impulse $lec$, provided during characteristic moment $m1$ of time slot $t31$. controls the reading of the coded combination stored in memory cell md31 therefore of the combination it31(w−1).

Storing impulse ecr, provided at end of time slot IT0(w+1), controls the storing of coded combination it31(w), provided by input register RR, into the memory cell md31.

Control circuit EX, which has detected the collision between the damping impulse tam and the trailing edge of the reading impulse, proceeds with the time shifting of the reading operations from m1 to m5 and routes towards memory MD the coded combinations stored in the first input register RA.

Thus, leading edge of impulse M7, provided during characteristic moment m7 of time slot t31, controls the triggering of flip-flop FF5 of the circuit XB (FIG. 6) into position 1. Signal rr passes to logic level 0, signal ra passes to logic level 1.

Impulse M1, provided during moment m1 of time slot t0, is without any effect on the operating process of the system.

Storing impulse ecr, provided at end of time slot IT1(w+1), controls the storing of the coded combination it1(w+1), originated from input register RA (impulse ecr referenced it1(w+1)A on the chronogram ecr in FIG. 9), into memory cell md1.

Reading impulse lec, provided during characteristic moment m5 of time slot t0, controls the reading of contents of the memory cell md0, that is to say of combination it0(w).

Operation of the circuit in present invention proceeds then normally in the manner already described above.

The new phase margin $n\phi$ in case of reverse jitter is defined by the time separating the leading edge of the reading impulse provided during the time slot t1, for instance, of the trailing edge of the damping impulse enframing the storing signal ecr of the coded combination it1(w+1). It is therefore superior by a time slot (3.9 μs) to the phase margin $m\phi$ which would have been obtained without the changement of input register, this margin $m\phi$ being defined by the time separating the leading edge of the reading impulse, provided during the time slot t1, for instance, from the trailing edge of the damping impulse enframing the storing signal of the coded combination it2(w +1) originated from register RA, which, without changement of register, would indeed have been the storing signal of the coded combination it1(w+1) originated from register RR.

Then the only perturbation brought about by this change of register is the absence of storing into memory of the coded combination it0(w +1) — that being of little importance — this combination being all the same operated by the supervision block SB. Indeed, the reading skip of the frame w is inherent to the time shift of the reading operation and is inevitable in asynchronous operation.

In the above description, it was assumed that impulse tam enframes the storing signal ecr. Operating process of the device in present invention would be identical in the case where a damping signal enframing the reading signal lec would be used.

Likewise, without departing from the scope of present invention, shifting of a channel time slot of the reading operations can be considered, the coded combinations stored in the junction memory still being the combinations originated from the first input register RA.

It is clearly understood that the preceding descriptions are made only by way of unrestrictive example and that numerous alternatives may be considered without departing from the scope of the invention. More particularly, the numerical details have been given only to make the description easier and may vary with each case of application.

We claim:

1. A synchronizing circuit for use in an exchange of a time division multiplex system, and in which a series of plural bit words is received by said exchange during successive time frames comprising a time slot for each word with each bit being received serially during a time element of a time slot and with each word being received at the clock rate of a distant office from which the series of words is transmitted, each word being forwarded within said exchange at a local clock rate of the same duration and extent as the clock rate of the distant office, said circuit including: a plurality of shift registers in cascade for receiving words from said office with each register capable of storing one word at a time, a multiple stage memory for storing therein in successive time slots, the words of a frame based on said distance clock rate, means in said exchange responsive to a signal for controlling storage of a word in said memory received from said shift registers, means responsive to a read signal during a preselected time element for reading a word from said memory, means for comparing a signal derived from said storage signal against said read signal, means responsive to a condition in which said derived signal coincides with a read signal for shifting said read signal to a time element spaced in time from the preselected time interval, and bistable means for causing reading of words from one or the other of said shift registers for storage in said memory dependent on the direction of said shifting.

2. A synchronizing circuit as claimed in claim 1, in which said bistable means controls the transfer of successive words from the shift registers to said memory and for controlling the transfer of words in said memory.

3. A synchronizing circuit as claimed in claim 1, in which there are time control means controlled by said bistable means for shifting addresses for the stages of said memory in coincidence with the shifting of data into said memory.

4. A circuit for synchronizing data in one exchange of a time division multiplex system with data received at a clock rate of an office transmitting said data to said exchange, said time system comprised of a plurality of recurring time slots in recurring time frames with each time slot adapted to contain one word of data, a multiple stage memory having capacity for storing therein a frame of data with each stage capable of storing a word of data, the transfer of data within said memory and transmission of data from said memory being at an independently derived exchange clock rate having the same basic rate as the office rate, said circuit including a first and a second cascaded series-to-parallel register means for receiving data from said office with each said register means having capability for storing data from one time slot, a first output path from the output of said first register means to the data input of said memory, a second output path from the output of said second register means to the data input of said junction memory, routing means for sensing a within-memory data transfer signal directed to said memory coinciding in time with a storage control signal for switching one of said output paths to an active condition to feed data from its register means to the memory, for switching said other path to an inactive condition, and further means for addressing the stages of said memory in accordance with the output path switched by said routing means.

5. A circuit as claimed in claim 4, in which said routing means comprises a bistable member operable to one or another state and a plurality of gates responsive to the coincidence of signals from framing time slots.

* * * * *